United States Patent [19]

Beer et al.

[11] 4,425,291
[45] Jan. 10, 1984

[54] METHOD FOR THE PRODUCTION OF MORE WATER-RESISTANT FOAMED ELEMENTS FROM WATERGLASS CONTAINING NATURAL LATEX DISPERSION

[75] Inventors: Günter Beer, Duisburg; Wolfgang Pesch, Grevenbroich; Wolfgang Friedemann, Neuss; Manfred Kupfer, Dünsen, all of Fed. Rep. of Germany

[73] Assignees: Henkel Kommanditgesellschaft Auf Aktien, Dusseldorf; Hansawerke Lurmann, Schutte & Co., Bremen, both of Fed. Rep. of Germany

[21] Appl. No.: 325,222

[22] Filed: Nov. 27, 1981

[30] Foreign Application Priority Data

Dec. 2, 1980 [DE] Fed. Rep. of Germany ....... 3045404

[51] Int. Cl.$^3$ .................... C04B 21/10; C04B 35/16
[52] U.S. Cl. ........................... 264/42; 106/75; 106/83; 106/84; 106/88; 106/122; 264/50
[58] Field of Search ............. 264/42, 50; 106/75, 106/83, 122, 84, 88

[56] References Cited

U.S. PATENT DOCUMENTS

| | | | |
|---|---|---|---|
| 3,508,940 | 4/1970 | Webb | 106/75 X |
| 3,707,385 | 12/1972 | Kraemer et al. | 106/75 X |
| 3,719,510 | 3/1973 | Temple et al. | 106/75 X |
| 3,782,982 | 1/1974 | Pierson et al. | 106/75 |
| 3,850,650 | 11/1974 | Von Bonin et al. | 106/75 |
| 3,864,137 | 2/1975 | von Bonin et al. | 106/75 |

FOREIGN PATENT DOCUMENTS

| | | |
|---|---|---|
| 1905340 | 8/1970 | Fed. Rep. of Germany . |
| 2165912 | 7/1973 | Fed. Rep. of Germany . |
| 50-23403 | 8/1975 | Japan ..................... 264/42 |

OTHER PUBLICATIONS

Chemical Abstracts, "Moldings of Foamed Water Glass" Karl Weber-8/6/70-(corres. to 1905340).

*Primary Examiner*—Philip E. Anderson
*Attorney, Agent, or Firm*—Hammond & Littell, Weissenberger and Muserlian

[57] ABSTRACT

A method for the production of a more water-resistant foamed element from waterglass consisting essentially of the steps of mixing together a major amount of an alkali metal silicate solution, with inorganic fillers, at least one alkali-resistant wetting agent in an amount sufficient to form a stable foam, at least one compound capable of hardening a waterglass foam in an amount sufficient to cause said alkali metal silicate to harden, and sufficient natural latex dispersion to cause the foamed element to have a greater water resistance, mechanically foaming said mixture by the incorporation of an inert gas thereon, filling the resultant foam into an element form capable of disassembly, curing said foam in said form, and recovering a more water-resistant foamed and cured element. Preferably the natural latex dispersion is employed in a 50% dispersion in an amount of from 0.2% to 30% by weight, preferably from 0.2% to 10% by weight, based on the total mixture. The alkali metal silicate solution used has, in the case of sodium silicate, a solids content of about 27% to 43% by weight at an $SiO_2/Na_2O$ molar ratio of about 4:1 to 3:1 and in the case of potassium silicate a solids content of about 20% to 36% by weight at an $SiO_2/K_2O$ molar ratio of about 4:1 to 3.4:1, it being possible to use any desired mixture ratios of the mentioned alkali metal silicates. The mixture may optionally contain an addition of 0.1% to 2.5% by weight, preferably from 1% to 2% by weight of $B_2O_3$. Preferably the wetting agent added to the mixture is an anionic tenside, such as a sodium $C_{14-16}$ alkylsulfonate, in an amount of from 0.1% to 10% by weight, preferably from 4% to 6% by weight in the form of a 30% aqueous solution. The fillers to be added to the mixture are inorganic compounds of light specific gravity in a grain size up to 0.1 mm and in an amount of up to 50% by weight, preferably from 10% to 20% by weight. The hardeners are preferably proportioned into the mixture during foaming in amounts of from 1% to 10% by weight, preferably from 2% to 6% by weight. The preferred hardener is glycerine triacetate.

15 Claims, No Drawings

METHOD FOR THE PRODUCTION OF MORE WATER-RESISTANT FOAMED ELEMENTS FROM WATERGLASS CONTAINING NATURAL LATEX DISPERSION

BACKGROUND OF THE INVENTION

The invention relates to a method for the production of foamed elements from a mixture containing alkali metal silicate solution (waterglass), inorganic fillers, wetting agents and hardeners, which is mechanically foamed, brought into the form of the desired element and thus cured.

The production of foamed elements from waterglass foam is known as recited in German Published Applications DE-OS No. 19 05 340 and DE-OS No. 21 57 371. The foaming is effected either by chemical expanding agents or by the blowing in or stirring in of gases such as air or steam. In the present context, however, only mechanical foaming, in particular by the stirring in of air, is of interest.

Such shaped elements formed on the basis of cured waterglass foam are suitable primarily for use as insulating material, both for heat insulation and soundproofing in the building trade. Of particular importance in this connection are moisture stability and high flameproofness.

The known methods for the production of shaped elements on the basis of cured waterglass foam have, however, not led to satisfactory products. The method known from DE-OS No. 19 05 340 requires much energy and leads to foam materials with inhomogeneous pore distribution and, accordingly, inhomogeneous thermal conductivity. The foamed elements made according to DE-OS No. 21 57 371 are, above all, not sufficiently moisture resistant. With the use of the known methods, difficulties have arisen in the course of the process as well as in handling the finished product.

OBJECTS OF THE INVENTION

An object of the present invention is the development of a method by which, at low production cost, shaped elements on the basis of waterglass foam usable especially as insulation material can be produced very safely, which are true to dimensions, transportable in the usual manner, and can be processed without any unusual precautionary measures.

Another object of the present invention is the development of a method for the production of a more water-resistant foamed element from waterglass consisting essentially of the steps of mixing together a major amount of an alkali metal silicate solution, with inorganic fillers, at least one alkali-resistant wetting agent in an amount sufficient to form a stable foam, at least one compound capable of hardening a waterglass foam in an amount sufficient to cause said alkali metal silicate to harden, and sufficient natural latex dispersion to cause the foamed element to have a greater water resistance, mechanically foaming said mixture by the incorporation of an inert gas thereon, filling the resultant foam into an element form capable of disassembly, curing said foam in said form, and recovering a more water-resistant foamed and cured element.

These and other objects of the invention will become more apparent as the description thereof proceeds.

DESCRIPTION OF THE INVENTION

The difficulties of the prior art have been overcome and the above objects have been achieved in that a natural latex dispersion is added to the above-described foamable waterglass mixture, which is foamed with it before the curing of the shaped foam is effected in known manner. It has been found that the incorporation of a natural latex dispersion into the waterglass foam definitely improves the properties of the shaped elements produced therefrom both during their formation (i.e. until they are cured) and of the finished products. There result shaped elements of uniform consistence with homogeneous pore distribution, high dimensional stability and sufficient mechanical strength, without any great impairment of the flameproofness. Of special importance is the increased moisture proofness of the foamed elements according to the invention. Also, the stability of the foam during the curing process is greatly improved and the tendency to shrink and to warp of the finished foam elements during drying and storage is reduced.

More particularly, the present invention relates to a method for the production of a more water-resistant foamed element from waterglass consisting essentially of the steps of mixing together a major amount of an alkali metal silicate solution, with inorganic fillers, at least one alkali-resistant wetting agent in an amount sufficient to form a stable foam, at least one compound capable of hardening a waterglass foam in an amount sufficient to cause said alkali metal silicate to harden, and sufficient natural latex dispersion to cause the foamed element to have a greater water resistance, mechanically foaming said mixture by the incorporation of an inert gas thereon, filling the resultant foam into an element form capable of disassembly, curing said foam in said form, and recovering a more water-resistant foamed and cured element.

DE-OS No. 19 05 340 provides that shaped elements produced on the basis of waterglass foam can be coated with a coating of an ammonia-stabilized latex to improve the deficient moisture proofness of the waterglass foam. Coating, however, is not apt really to impart a sufficient moisture proofness to the shaped element, especially because damage to the coating already during transport and also during handling as the shaped elements are being installed must be reckoned with. It is thus the more surprising that the problem of moisture proofness of waterglass foams can be solved by direct incorporation of the latex into the foam structure containing waterglass as well as filler, wetting agent and hardener, without having to accept major disadvantages in other areas.

Of special importance in this connection is that the latex addition is made in the form of an aqueous natural latex dispersion. Preferably there is used a 50% aqueous natural latex dispersion in an amount of 0.2% to 30% by weight, preferably 0.2% to 10% by weight, based on the total mixture. Depending on the kind and proportion of the other mixture constituents, the individual selection of the amount of the latex component will be made in consideration of the fact that the flameproofness increases with decreasing addition, while the moisture stability increases with increasing addition.

The fillers for the shaped elements which may be used are, in particular, inorganic compounds of light specific gravity, for example, the aluminum silicate powder known as "Perligran," or expanded clays (magnesium aluminum silicate "Vermiculite"). Also suitable are ground broken glass (solid alkali metal silicate), glass flour, glass balls, silicic acid, alumina or coloring pigments, such as titanium dioxide, iron oxides, chromium oxides or ultramarine. Further there enter into consideration as fillers possibly also inorganic compounds of heavier specific gravity—for example chalk, quartz flour, aluminum hydroxide, aluminous cements, which then, of course, must be used in smaller quantities. The upper limit of the specific gravity of the filler derives from the mechanical loadability of the foam during formation of the shaped elements. It is limited further by the processability of the mixture in the mixers normally used for foaming. Accordingly, it is advantageous to admix the fillers in a particle size of up to 0.1 mm and in an amount of up to 50% by weight, preferably 10% to 20% by weight, based on the total mixture.

Generally, also, filler mixtures may be used for the foamed elements according to the invention. If desired, also fibrous fillers, such as glass fibers, mineral wool or asbestos, can be incorporated in the foam.

Preferably there is proportioned in during foaming from 1% to 10% by weight, preferably from 2% to 6% by weight of a hardener for waterglass foams, preferably glycerine triacetate. Instead of this hardener, there enter into consideration as hardeners generally all those organic and inorganic compounds which are normally employed for the curing of waterglass, for example, other acid-splitting esters or acid anhydrides or inorganic hardeners such as amorphous chalk, alkaline-earth metal oxides (magnesium oxide) or sodium silicofluoride. Naturally, also, hardener mixtures can be used.

In principle, under the present method all current types of waterglass may be used. Preferred, however, are those types which are not highly alkaline but have a higher silicate component. Thus it is provided, in particular, that in the case of sodium silicate the alkali metal silicate solution has a solids content of about 27% to 43% by weight at a silicon dioxide/sodium oxide molar ratio of about 4:1 to 3:1, and in the case of potassium silicate, a solids content of about 20% to 36% by weight at a silicon dioxide/potassium oxide molar ratio of about 4:1 to 3.4:1. It is possible to use any desired mixture ratios of the mentioned alkali metal silicates.

For further improvement of the moistureproofness of the foamed element also borate-modified waterglasses may be used. The alkali metal silicate solution then preferably has an addition of 0.1% to 2.5% by weight, in particular 1% to 2% by weight of $B_2O_3$.

The wetting agents used (foam builders) should in any case be alkali-stable. For this there are available alkali-stable anionic and/or nonionic tensides. Preferably, the anionic tenside $NaC_{14}$–$C_{16}$ alkylsulfonate is used advantageously in an amount of 0.1% to 10% by weight, more particularly 4% to 6% by weight, based on the total mixture, as a 30% aqueous solution.

The following examples are illustrative of the practice of the invention without being limitative.

EXAMPLES

The following formulations were prepared and mixed as described.

Example 1

| Parts by weight | |
|---|---|
| 86.8 | sodium silicate solution (26.9% $SiO_2$/8.0% $Na_2O$) molar ratio 3.46 (solids content: 34.9% by weight) |
| 2.0 | foam builder (Na $C_{14}$–$C_{16}$ alkylsulfonate, 30% aqueous solution) |
| 0.2 | natural latex (50% dispersion) |
| 9.0 | Perligran powder |
| 2.0 | glycerine triacetate |
| Foam weight | 0.2 to 0.3 kg/liter |

Example 2

| Parts by weight | |
|---|---|
| 70.5 | sodium silicate solution (26.9% $SiO_2$/8.0% $Na_2O$) molar ratio 3.46 (solids content: 34.9% by weight) |
| 3.5 | foam builder (Na $C_{14}$–$C_{16}$ alkylsulfonate, 30% aqueous solution) |
| 6.0 | Perligran powder |
| 6.0 | glass balls, hollow |
| 10.0 | natural latex (50% dispersion) |
| 4.0 | glycerine triacetate |
| Foam weight | 0.2 to 0.3 kg/liter |

Example 3

| Parts by weight | |
|---|---|
| 51.1 | sodium silicate solution (26.9% $SiO_2$/8.0% $Na_2O$) molar ratio 3.46 (solids content: 34.9% by weight) |
| 3.8 | water |
| 3.8 | foam builder (Na $C_{14}$–$C_{16}$ alkylpolyglycolethersulfate, 30% aqueous solution) |
| 25.0 | natural latex (50% dispersion) |
| 6.0 | Perligran powder |
| 7.5 | glass balls, hollow |
| 0.8 | pigments |
| 2.0 | glycerine triacetate |
| Foam weight | 0.4 to 0.5 kg/liter |

Example 4

| Parts by weight | |
|---|---|
| 66.7 | sodium silicate solution (23.7% $SiO_2$/10.7% $K_2O$) molar ratio 3.46 (solids content: 34.4% by weight) |
| 6.7 | water |
| 9.2 | glass balls, hollow |
| 9.2 | Perligran powder |
| 0.3 | natural latex (30% dispersion) |
| 4.6 | foam builder (Na—dodecylbenzenesulfonate, 30% aqueous solution) |
| 3.3 | glycerine triacetate |
| Foam weight | 0.2 to 0.3 kg/liter |

Example 5

| Parts by weight | |
|---|---|
| 54.7 | potassium silicate solution (23.7% SiO$_2$/10.7% K$_2$O) molar ratio 3.46 (solids content: 34.4% by weight) |
| 7.1 | water |
| 10.2 | glass balls, hollow |
| 9.1 | Perligran powder |
| 4.9 | foam builder (Na—dibutylnaphthalenesulfonate, 30% aqueous solution) |
| 4.0 | glycerine triacetate |
| 10.0 | natural latex (20% dispersion) |
| Foam weight | 0.3 to 0.4 kg/liter |

Example 6

| Parts by weight | |
|---|---|
| 51.7 | potassium silicate solution (23.7% SiO$_2$/10.7% K$_2$O) molar ratio 3.46 (solids content: 34.4% by weight) |
| 5.1 | water |
| 5.2 | glass balls, hollow |
| 8.6 | Perligran powder |
| 0.5 | pigments |
| 20.0 | natural latex (50% dispersion) |
| 4.5 | foam builder (Disodium-cocosalkylsulfosuccinamide, 30% aqueous solution) |
| 4.4 | glycerine triacetate |
| Foam weight | 0.4 to 0.5 kg/liter |

Example 7

| Parts by weight | |
|---|---|
| 70.0 | alkali metal silicate solution (26.1% SiO$_2$/6.0% Na$_2$O/ 2.7% K$_2$O) molar ratio 3.46 (solids content: 34.8% by weight) |
| 7.0 | water |
| 9.4 | glass balls, hollow |
| 6.2 | Perligran powder |
| 0.2 | natural latex (50% dispersion) |
| 4.0 | foam builder (Na C$_{14}$-C$_{16}$ - alkylsulfonate, 30% aqueous solution) |
| 3.2 | glycerine triacetate |
| Foam weight | 0.2 to 0.3 kg/liter |

In all cases the foaming was done by laboratory test intermittently, or, with a mechanical air foamer ("Hansa Mixer"), continuously.

(a) Laboratory test

The waterglass was mixed homogeneously with the fillers, the foam builder (wetting agent) was added and the mixture was beaten intensively for about 4 minutes with a laboratory whipper (Starmix brand) in position II. Hardener (glycerine triacetate) having then been added, the mixture was stirred once more for about 30 seconds and the foam composition was poured into plastic molds for curing. The curing took about 30 to 60 minutes.

(b) "Hansa Mixer"

With the "Hansa Mixer" the waterglass-filler-foam builder mixture was enriched with an air quantity to be proportioned exactly, and thereafter the mixture was beaten to foam with the application of high shearing forces. Shortly before the product left the foam machine, the hardener was proportioned in very homogeneously and in fine division.

The advantage of the "Hansa Mixer" method over the Laboratory test resides in that by exact air proportioning and mixing, very homogeneous foams with uniform pore structures can be produced continuously.

The drying took place depending on the thickness of the boards formed out of the foam for 4 to 8 days at room temperature or for 4 to 16 hours at about 110° C. in the circulating-air drying cabinet. In both cases a slight shrinkage occurred, and in part also a deformation, although always a slight one.

The foamed elements of Examples 1 to 7 were formstable even after storage in water for 48 hours, thereby proving their moistureproofness.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A method for the production of a more water-resistant foamed element from waterglass consisting essentially of the steps of mixing together a major amount of an alkali metal silicate solution, with inorganic fillers, at least one alkali-resistant wetting agent in an amount sufficient to form a stable foam, at least one compound capable of hardening a waterglass foam in an amount sufficient to cause said alkali metal silicate to harden, and sufficient natural latex dispersion to cause the foamed element to have a greater water resistance, mechanically foaming said mixture by the incorporation of an inert gas thereon, molding the resultant foam, curing said molded foam, and recovering a more water-resistant foamed and cured element.

2. The method of claim 1 wherein a 50% aqueous natural latex dispersion is used in an amount of from 0.2% to 30% by weight, based on the total mixture.

3. The method of claim 2 wherein said dispersion is used in an amount of from 0.2% to 10% by weight, based on the total mixture.

4. The method of claim 1 or 2 or 3 wherein said alkali metal silicate solution is selected from the group consisting of sodium silicate solution having a solids content of about 27% to 43% by weight and a SiO$_2$/Na$_2$O molar ratio of about 4:1 to 3:1, potassium silicate solution having a solids content of about 20% to 36% by weight and a SiO$_2$/K$_2$O molar ratio of about 4:1 to 3.4:1, and mixtures thereof.

5. The method of claim 1 or 2 or 3 wherein said alkali metal silicate solution contains from 0.1% to 2.5% by weight of B$_2$O$_3$.

6. The method of claim 4 wherein said alkali metal silicate solution contains from 0.1% to 2.5% by weight of B$_2$O$_3$.

7. The method of claim 5 wherein said alkali metal silicate solution contains from 1% to 2% by weight of B$_2$O$_3$.

8. The method of claim 6 wherein said alkali metal silicate solution contains from 1% to 2% by weight of B$_2$O$_3$.

9. The method of claim 1 or 2 or 3 wherein said alkali-stable wetting agent is anionic and is present in an amount of from 0.1% to 10% by weight.

10. The method of claim 9 wherein said anionic wetting agent is $Na_{14}$-$C_{16}$ alkylsulfonate present as a 30% aqueous solution and employed in an amount of from 4% to 6% by weight, based on the total mixture.

11. The method of claim 1 or 2 or 3 wherein said inorganic fillers are of light specific gravity and have a particle size of up to 0.1 mm.

12. The method of claim 11 wherein said light inorganic fillers are present in an amount of from 1% to 50% by weight.

13. The method of claim 12 wherein said light inorganic fillers are present in an amount of from 10% to 20% by weight.

14. The method of claim 1 or 2 or 3 wherein said at least one compound capable of hardening a waterglass foam is an acid-splitting ester or acid anhydride present in an amount of from 1% to 10% by weight.

15. The method of claim 14 wherein said acid-splitting ester or acid anhydride is glycerine triacetate present in an amount of from 2% to 6% by weight.

* * * * *

UNITED STATES PATENT AND TRADEMARK OFFICE
CERTIFICATE OF CORRECTION

PATENT NO. : 4,425,291
DATED : January 10, 1984
INVENTOR(S) : GÜNTER BEER et al.

It is certified that error appears in the above-identified patent and that said Letters Patent is hereby corrected as shown below:

Column 7, line 2 of Claim 10, "$Na_{14}-C_{16}$" should read -- $Na\ C_{14}-C_{16}$ --.

Signed and Sealed this

Nineteenth Day of March 1985

[SEAL]

Attest:

DONALD J. QUIGG

Attesting Officer     Acting Commissioner of Patents and Trademarks